United States Patent
Ohmori et al.

(10) Patent No.: US 6,601,444 B2
(45) Date of Patent: Aug. 5, 2003

(54) EXHAUST GAS CHARACTERISTIC DETECTING APPARATUS FOR INTERNAL COMBUSTION ENGINE

(75) Inventors: Kenichi Ohmori, Saitama-ken (JP); Shusuke Akazaki, Saitama-ken (JP); Kei Machida, Saitama-ken (JP); Norihito Watanabe, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/820,717

(22) Filed: Mar. 30, 2001

(65) Prior Publication Data

US 2001/0054309 A1 Dec. 27, 2001

(30) Foreign Application Priority Data

Jun. 27, 2000 (JP) ........................................ 2000-193519

(51) Int. Cl.[7] ...................... G01M 19/00; G01N 33/497
(52) U.S. Cl. ...................... 73/118.1; 73/23.31
(58) Field of Search ............... 73/116, 118.1, 73/23.31, 23.32; 60/290, 293, 294, 297, 298, 299, 300; 123/320, 321, 322, 324, 327

(56) References Cited

FOREIGN PATENT DOCUMENTS

JP 407332074 * 12/1995 ............. F01N/3/24

* cited by examiner

*Primary Examiner*—Edward Lefkowitz
*Assistant Examiner*—Maurice Stevens
(74) *Attorney, Agent, or Firm*—Arent Fox Kintner Plotkin & Kahn (57) ABSTRACT

In an internal combustion engine having a double-structure exhaust passage comprised of an inner (bypass) exhaust passage and an outer (main) exhaust passage arranged to surround the outside of the inner exhaust passage such that exhaust gases are discharged through one of the inner and outer exhaust passages, an exhaust gas characteristic detecting apparatus is capable of reliably detecting the characteristic of exhaust gases through the inner exhaust passage. The detecting apparatus comprises a guide pipe extending across the outer exhaust passage and having an exhaust gas introducing port facing the inner exhaust passage for introducing exhaust gases flowing into the inner exhaust passage into the guide pipe, and a sensor having a sensing unit for detecting the humidity of exhaust gases and arranged such that the sensing unit is positioned in the guide pipe.

2 Claims, 7 Drawing Sheets

EXHAUST GAS CHARACTERISTIC DETECTING APPARATUS FOR INTERNAL COMBUSTION ENGINE

BACKGROUND OF THE INVENTION

1. Field of the Invention

The present invention relates generally to an exhaust gas characteristic detecting apparatus for an internal combustion engine, and more particularly, to an exhaust gas characteristic detecting apparatus for use with an internal combustion engine which has a double-structure exhaust passage comprised of an inner exhaust passage and an outer exhaust passage for detecting the characteristic of exhaust gases which flow through the inner exhaust passage.

2. Description of the Prior Art

A conventional internal combustion engine having a double-structure exhaust passage is known, for example, in Laid-open Japanese Patent Application No. 7-332074. An exhaust system of this internal combustion engine comprises a catalyzer arranged in an intermediate portion of the exhaust system, and an inner exhaust passage and an outer exhaust passage which are branched off at a location downstream of the catalyzer and joined at a location downstream of the branch. The outer exhaust passage is arranged to completely surround the inner exhaust passage. Also, the inner exhaust passage is filled with a hydrocarbon (HC) adsorbent for adsorbing hydrocarbons and moisture in exhaust gases. The inner exhaust passage is joined to the outer exhaust passage at a location immediately downstream of the HC adsorbent. Further, a flow path switching valve is provided at the joint for switching a flow path of exhaust gases from the catalyzer to the outer exhaust passage or to the inner exhaust passage. In this internal combustion engine, the flow path of exhaust gases is switched by the flow path switching valve to the inner exhaust passage immediately after the engine is started. Hydrocarbons included in the exhaust gases immediately after the start cannot be purified by the catalyzer, since it has not been activated due to a low temperature immediately after the start, and therefore are adsorbed by the HC adsorbent when they pass therethrough. Subsequently, as the catalyzer is heated by the heat of the exhaust gases after the start of the engine and eventually activated, the exhaust gas flow path is switched to the outer exhaust passage by the flow path switching valve. This causes the exhaust gases to flow through the outer exhaust passage, so that the HC adsorbent is heated by heat exchange with the exhaust gases to desorb the adsorbed hydrocarbons. The desorbed hydrocarbons are recirculated to the catalyzer for purification.

In addition, since the HC adsorbent adsorbs hydrocarbons and moisture in exhaust gases, a humidity sensor may be provided, for example, at a location downstream of the HC adsorbent such that a deterioration of the HC adsorbent can be determined by detecting the humidity of exhaust gases which have passed through the HC adsorbent.

Further, a structure for attaching a sensor to an exhaust pipe is known, for example, in Laid-open Japanese Patent Application No. 7-332074. This sensor, which is an oxygen concentration sensor for detecting an oxygen concentration, is attached at a location downstream of a catalyst in an exhaust pipe with a sensing unit at a leading end thereof protruding into the exhaust pipe. The exhaust pipe is also provided with a guide pipe for guiding exhaust gases, after passing through the catalyst, to the sensing unit of the oxygen concentration sensor. This guide pipe is formed along the exhaust pipe and tapered toward the sensing unit of the oxygen concentration sensor.

When the aforementioned deterioration determining technique is applied to the conventional internal combustion engine, a humidity sensor must be arranged at a location downstream of an adsorbent in order to detect the humidity in exhaust gases which have passed through the adsorbent. In this event, a portion immediately downstream of the adsorbent is used as a joint at which both exhaust passages are joined together and in which a flow path switching valve is also arranged. Therefore, if an attachment structure similar to that for the oxygen concentration sensor is simply applied to attach the humidity sensor to the exhaust system, a guide pipe and the humidity sensor must be arranged at locations downstream of the joint. As a result, exhaust gases from the outer exhaust passage as well as exhaust gases from the inner exhaust passage pass through the humidity sensor, so that the humidity sensor is exposed to the exhaust gases at all times irrespective of whether or not the humidity need be detected, resulting in a higher susceptibility to corrosion and so on and a shorter lifetime.

OBJECT AND SUMMARY OF THE INVENTION

The present invention has been made to solve the problems as mentioned above, and its object is to provide an exhaust gas characteristic detecting apparatus for an internal combustion engine which is capable of reliably detecting the characteristic of exhaust gases passing through an inner exhaust passage out of inner and outer exhaust passages in a double-structure exhaust passage, and capable of extending the lifetime of a sensor.

To achieve the above object, the present invention provides an exhaust gas characteristic detecting apparatus for an internal combustion engine which has an inner exhaust passage and an outer exhaust passage arranged to surround the outside of the inner exhaust passage such that exhaust gases are discharged through one of the inner and outer exhaust passages. The exhaust gas characteristic detecting apparatus is adapted to detect a characteristic of exhaust gases passing through the inner exhaust passage, and includes a guide pipe extending across the outer exhaust passage and having an exhaust gas introducing port facing the inner exhaust passage for introducing exhaust gases flowing into the inner exhaust passage into the guide pipe, and a sensor having a sensing unit for detecting the characteristic (for example, humidity) of exhaust gases and arranged such that the sensing unit is positioned in the guide pipe.

According to the foregoing exhaust gas characteristic detecting apparatus for an internal combustion engine, exhaust gases flowing into the inner exhaust passage is introduced into the guide pipe through the exhaust gas introducing port. Then, the characteristic of the introduced exhaust gases is detected by the sensing unit of the sensor which is positioned in the guide pipe. It is therefore possible to reliably detect the characteristic of the exhaust gases flowing into the inner exhaust passage. Also, since the guide pipe extends across the outer exhaust passage, the sensing unit is protected by the guide pipe when exhaust gases flow through the outer exhaust passage and therefore is not exposed to the exhaust gases. As a result, the sensing unit of the sensor is exposed to the exhaust gases for a shorter time than before, so that the sensor is less susceptible to corrosion and so on and can extend the lifetime.

Preferably, in an embodiment of the exhaust gas characteristic detecting apparatus for an internal combustion engine, the inner exhaust passage includes an adsorbent arranged therein for temporarily adsorbing unburnt components and moisture in exhaust gases flowing into the inner exhaust passage and desorbing the once adsorbed unburnt components and moisture, the guide pipe is arranged at a location downstream of the adsorbent in the inner exhaust passage, and the sensor includes a humidity sensor for detecting a humidity of exhaust gases which have passed through the adsorbent.

According to this embodiment, since the humidity of exhaust gases which have passed through the adsorbent can be detected by the humidity sensor, the moisture adsorbing capability of the adsorbent, for example, can be determined by a detection signal indicative of the humidity detected by the humidity sensor to make a deterioration determination for the adsorbent in consequence.

DETAILED DESCRIPTION OF THE EMBODIMENT

Figure 1:
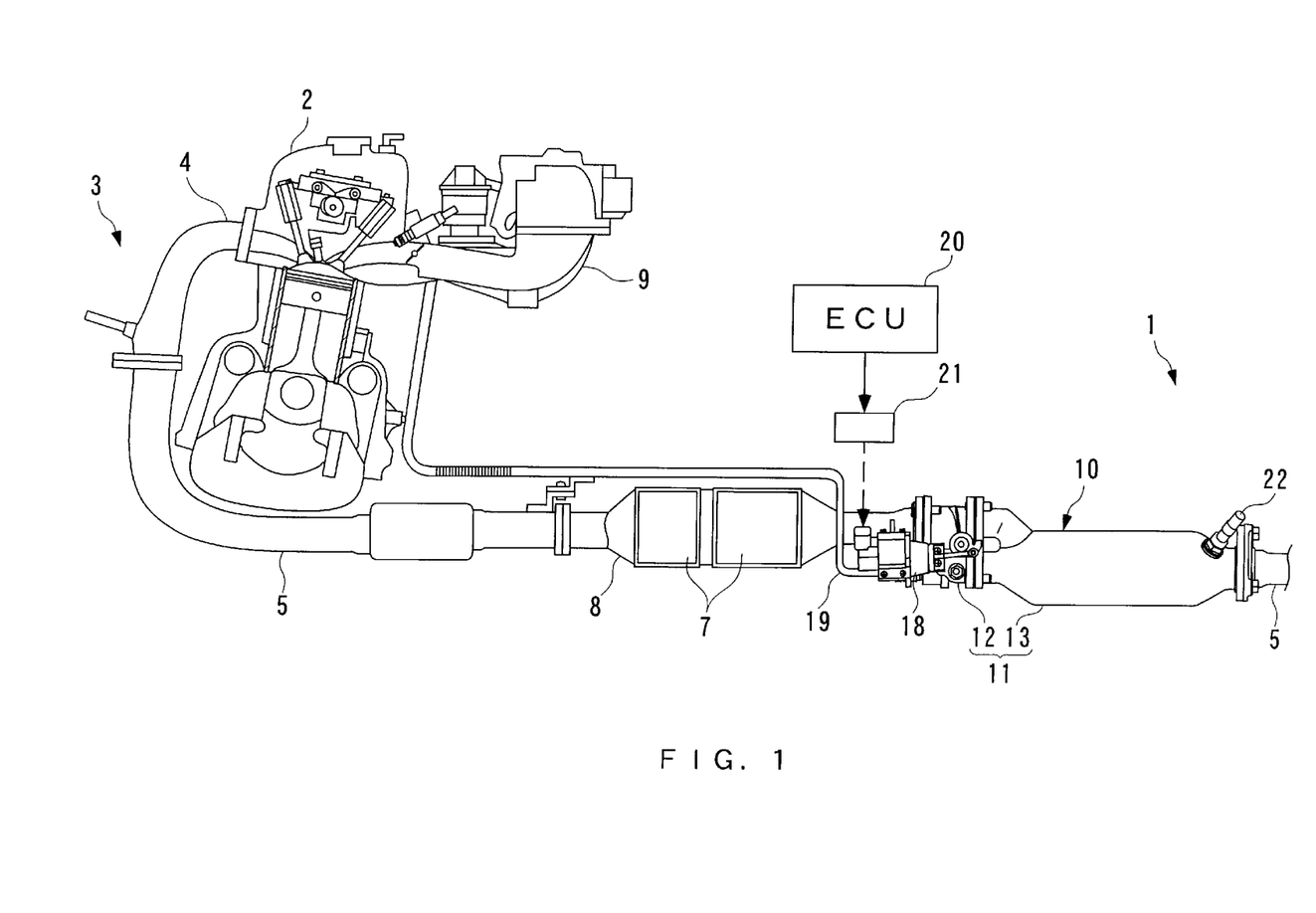
FIG. 1 is a diagram generally illustrating an internal combustion engine which is equipped with an exhaust gas humidity detecting apparatus according to one embodiment of the present invention.

In the following, an exhaust gas humidity detecting apparatus (exhaust gas characteristic detecting apparatus) for an internal combustion engine according to one embodiment of the present invention will be described in detail with reference to the accompanying drawings. FIG. 1 illustrates an internal combustion engine which comprises the exhaust gas humidity detecting apparatus of this embodiment. The exhaust gas humidity detecting apparatus 1 is arranged in an exhaust system 3 of an internal combustion engine 2 (hereinafter simply referred to the "engine 2") to detect the humidity of exhaust gases emitted from the engine 2 and flowing through a bypass exhaust passage 15, later described.

An exhaust pipe 5 is connected to the engine 2 through an exhaust manifold 4. At intermediate locations in the exhaust pipe 5, there are provided, in order from the upstream side, a catalyzer 8 having two three-way catalysts 7 for purifying exhaust gases, and an HC adsorber 10 for adsorbing and processing hydrocarbons. The two three-way catalysts 7 are arranged adjacent to each other along the exhaust pipe 5. The three-way catalysts 7, when activated, purify harmful substances (hydrocarbons, carbon monoxide and nitrogen compounds) in exhaust gases passing through the catalyzer 8 by oxidation-reduction catalyst actions. The three-way catalysts 7 begins activating at a predetermined activation starting temperature (for example, at 100° C.) or higher, and is fully activated when it reaches a full activation temperature (for example, 300° C.) higher than the activation starting temperature.

The HC adsorbent 10, in turn, adsorbs hydrocarbons in exhaust gases until a predetermined time period t1 elapses after starting the engine 2 (for example, about 40 seconds immediately after the starting), at which time the respective three-way catalysts 7 reach the activation starting temperature, thereby preventing hydrocarbons in the exhaust gases from being emitted to the atmosphere.

Figure 2:
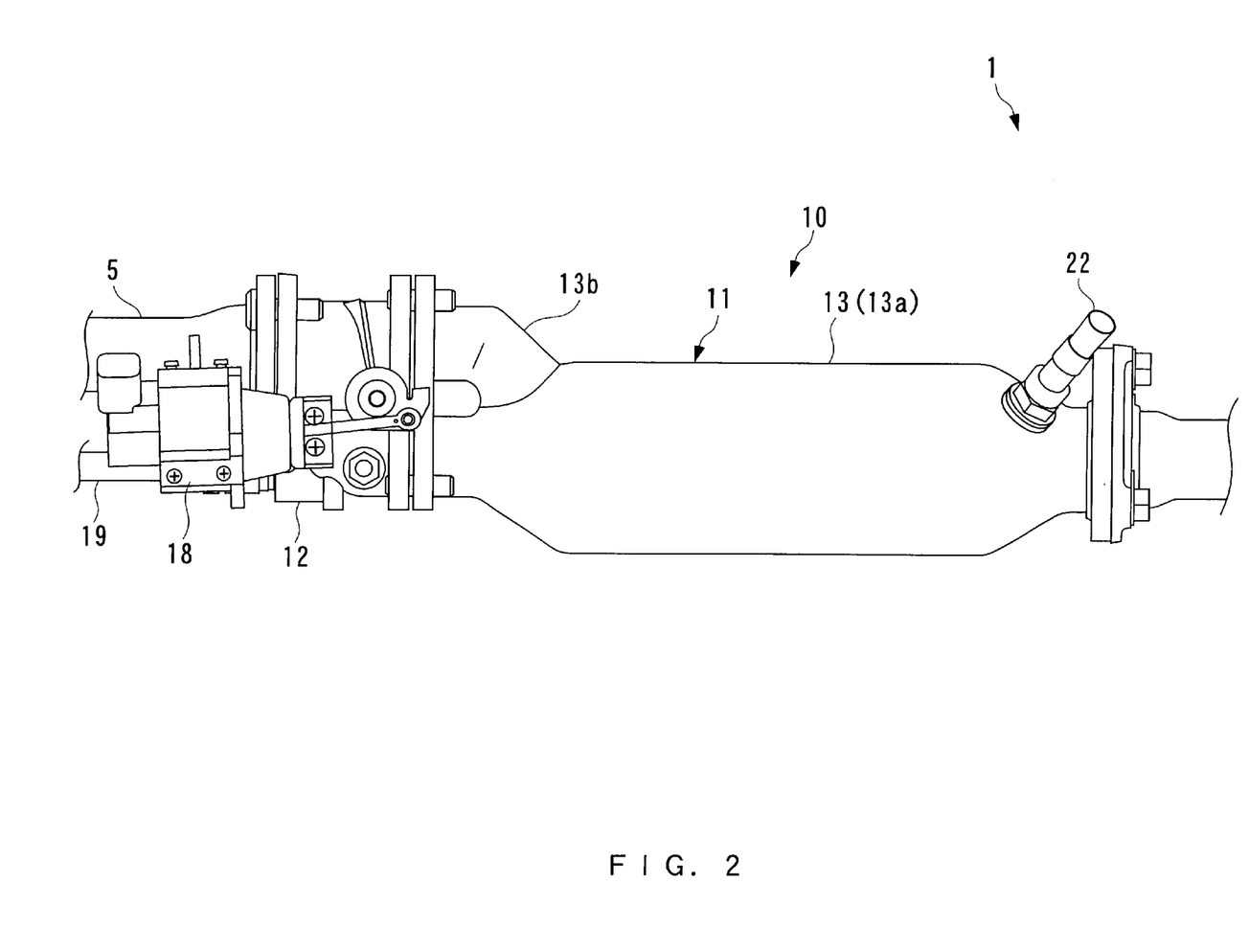
FIG. 2 is a side view generally illustrating the structure of an exhaust system which comprises the exhaust gas humidity detecting apparatus.
Figure 3:
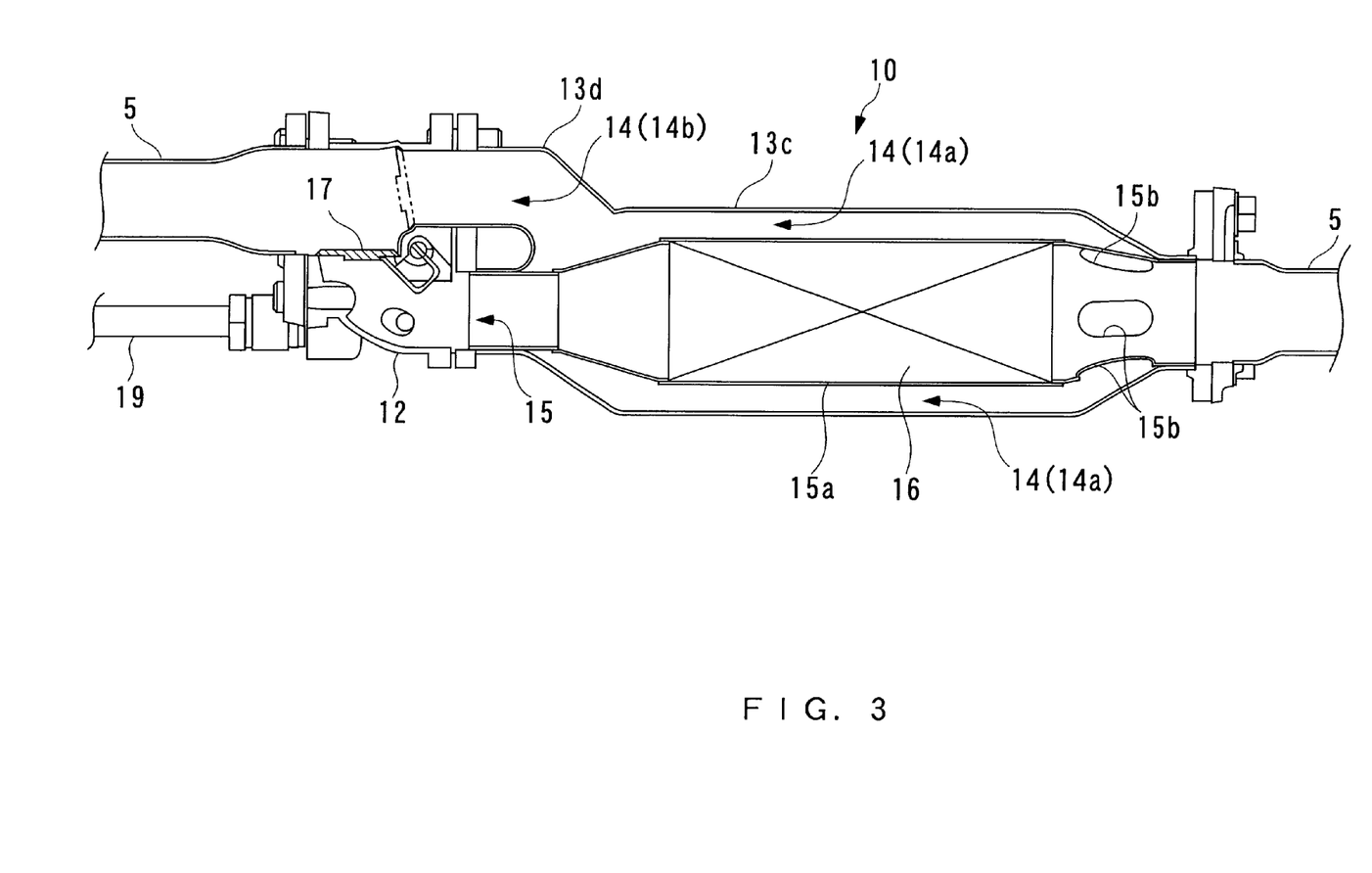
FIG. 3 is a cross-sectional view of FIG. 2.

As illustrated in FIGS. 2 and 3, the HC adsorbent 10 comprises an elongated case 11; a main exhaust passage (outer exhaust passage) 14 having a troidal cross-section and formed within the case 11; a bypass exhaust passage (inner exhaust passage) 15 formed inside the main exhaust passage 14 and branched off the main exhaust passage 14 and subsequently joined thereto; an HC adsorbent 16 arranged in the bypass exhaust passage 15; and a flow path switching valve 17 for switching a flow path of exhaust gases in the HC adsorbent 10 to one of the main exhaust passage 14 and the bypass exhaust passage 15.

The case 11 is composed of a branch case 12 and a junction case 13 arranged in combination at a location downstream of the branch case 12, which are integrally assembled into the case 11. The branch case 12 and junction case 13 are both made of a metal (for example, stainless steel). The main exhaust passage 14 extends through the branch case 12, and an upstream end of the bypass exhaust passage 15 is branched off an upstream end of the main exhaust passage 14 in the branch case 12.

Figure 4:
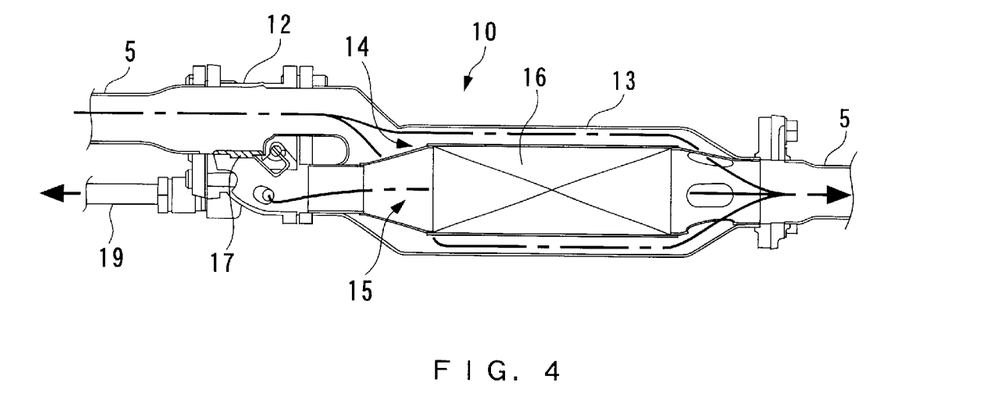
FIG. 4 is a diagram illustrating a state in which an exhaust gas flow path is switched to a main exhaust passage.
Figure 5:
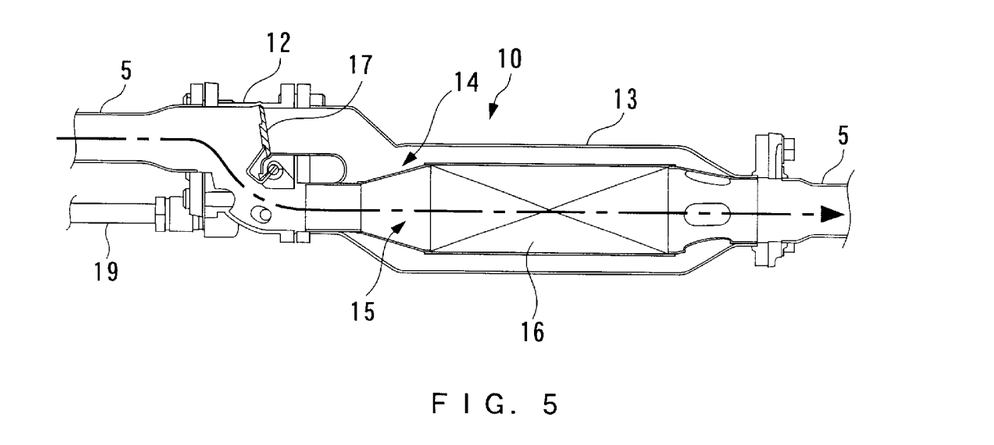
FIG. 5 is a diagram illustrating a state in which the exhaust gas flow path is switched to a bypass exhaust passage.

The flow path switching valve 17 is arranged at the branch in the branch case at which the bypass exhaust passage 15 is branched off the main exhaust passage 14 for pivotal movements about a horizontal axis. The flow path switching valve 17 pivots between a main position (the position indicated in FIG. 4) at which the bypass exhaust passage 15 is closed and the main exhaust passage 14 is simultaneously opened, and a bypass position (the position indicted in FIG. 5) at which the main exhaust passage 14 is closed and the bypass exhaust passage 15 is simultaneously opened.

An actuator 18 is further attached to the branch case 12 for driving the flow path switching valve 17. This actuator 18 is driven by a negative pressure supplied thereto. The flow path switching valve 17 is held at the main position by an urging force of a twisted coil spring, not shown, when the actuator 18 is not supplied with the negative pressure. On the other hand, the actuator drives the flow path switching valve 17 from the main position to the bypass position against the urging force of the twisted coil spring, and holds the flow path switching valve 17 at the bypass position, when it is supplied with the negative pressure.

The actuator 18 is connected to an intake pipe 9 through a negative pressure pipeway. The negative pressure pipeway (only a portion of which is shown) is provided with an actuator driving electromagnetic valve 21 for opening and closing the same, which is connected to an ECU 20. The ECU 20 controls opening/closing of the actuator driving electromagnetic valve 21 to supply or not the actuator 18 with a negative pressure in the intake pipe 9, thereby causing the actuator 18 to switch the flow path switching valve 17 as described above.

An EGR pipe 19 has one end connected to the bypass exhaust passage 15 of the branch case 12, and the other end connected to the intake pipe 9. Also, a duty control valve, not shown, is provided at an intermediate location of the EGR pipe 19 for controlling the amount of exhaust gases (EGR amount) circulated to the intake pipe 9 under the control of ECU 20.

Figure 7A:
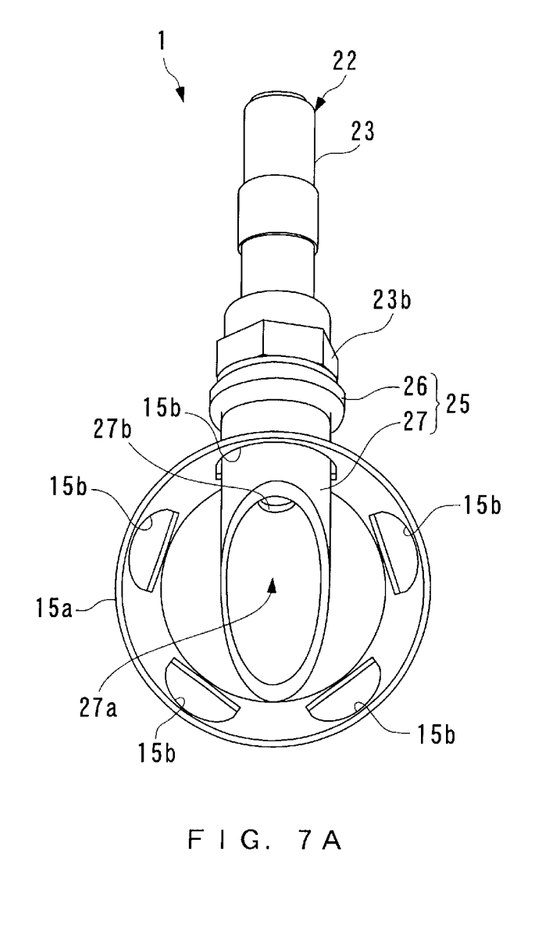
FIGS. 7A and 7B are a front view and a back view, respectively, generally illustrating the structure of the exhaust gas humidity detecting apparatus.
Figure 7B:
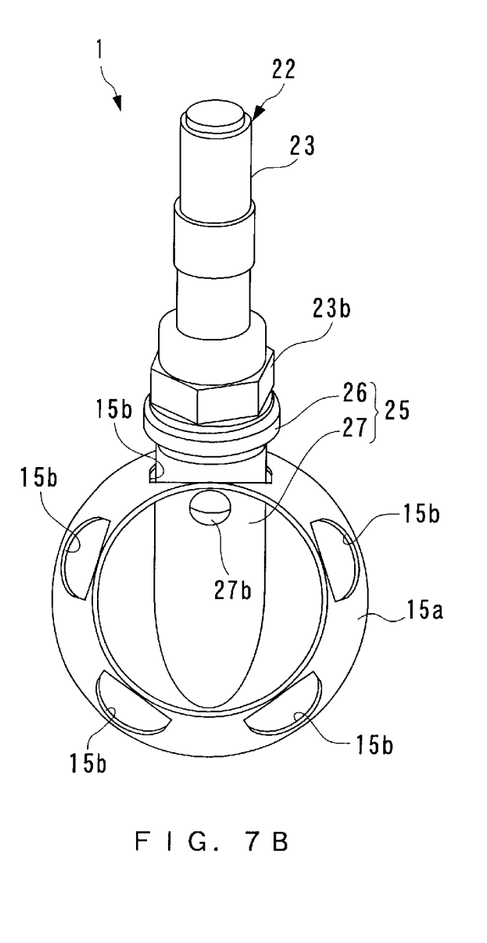

The junction case 13, on the other hand, comprises a larger cylinder 13a having the bypass exhaust passage 15 formed concentrically therewith, and a smaller cylinder 13b connected to an upstream end of the larger cylinder 13a. The larger cylinder 13a has tapered upstream and downstream ends. The bypass exhaust passage 15 has a passage wall 15a made of a highly thermally conductive metal (for example, stainless steel), and is similar to the larger cylinder 13a in that it is cylindrical in shape and its upstream and downstream ends are tapered. Further, the upstream and downstream ends of the passage wall 15a of the bypass exhaust passage 15 are connected to the inner face of the junction case 13 in an air tight state. The bypass exhaust passage 15 is also formed in a downstream portion of the passage wall 15a with five oval throughholes 15b at equal intervals in the circumferential direction (see FIG. 7).

The bypass exhaust passage 15 in the junction case 13 is continuous to the bypass exhaust passage 15 of the branch case 12 and to the exhaust pipe 5 on the downstream side. The main exhaust passage 14 in the junction case 13, on the other hand, is comprised of a flow-in passage 14b extending into the smaller cylinder 13d, and a troidal passage 14a continuous to the flow-in passage 14b, extending into the larger cylinder 13a and completely surrounding the bypass exhaust passage 15. The troidal passage 14a has its upstream end continuous to the main exhaust passage 14 of the branch case 12 and its downstream end joined to the downstream end of the bypass exhaust passage 15 through the throughholes 15b.

The HC adsorbent 16 is filled in the entire cross section of the bypass exhaust passage 15 except for the upstream and downstream ends. The HC adsorbent 16 is comprised of a honeycomb core (not shown), made of a metal (for example, stainless steel), which carries zeolite on its surface, and comprises a multiplicity of inner holes (not shown) which extend through the bypass exhaust passage 15. Then, as exhaust gases introduced into the bypass exhaust passage 15 pass through the inner holes of the HC adsorbent 16, hydrocarbons and moisture in the exhaust gases are adsorbed by the zeolite in the HC adsorbent 16.

Zeolite, which has high heat resistant properties, adsorbs hydrocarbons (unburnt components) when its temperature is below a predetermined desorption starting temperature (for example, below 100° C.), begins desorbing hydrocarbons once adsorbed thereby when its temperature rises to the desorption starting temperature or higher, and completely desorbs the adsorbed hydrocarbons when its temperature rises to a predetermined full desorption temperature TREF (for example, 200° C.) or higher. Then, the hydrocarbons desorbed from the zeolite are recirculated to the intake pipe 9 through an EGR pipe 19 and burnt by the engine 2. It should be noted that the zeolite is only required to have the ability of adsorbing hydrocarbons and is not particularly limited in the type. This embodiment employs a mixture of USY (Y-type), Ga-MFI and ferrierite.

Figure 6:
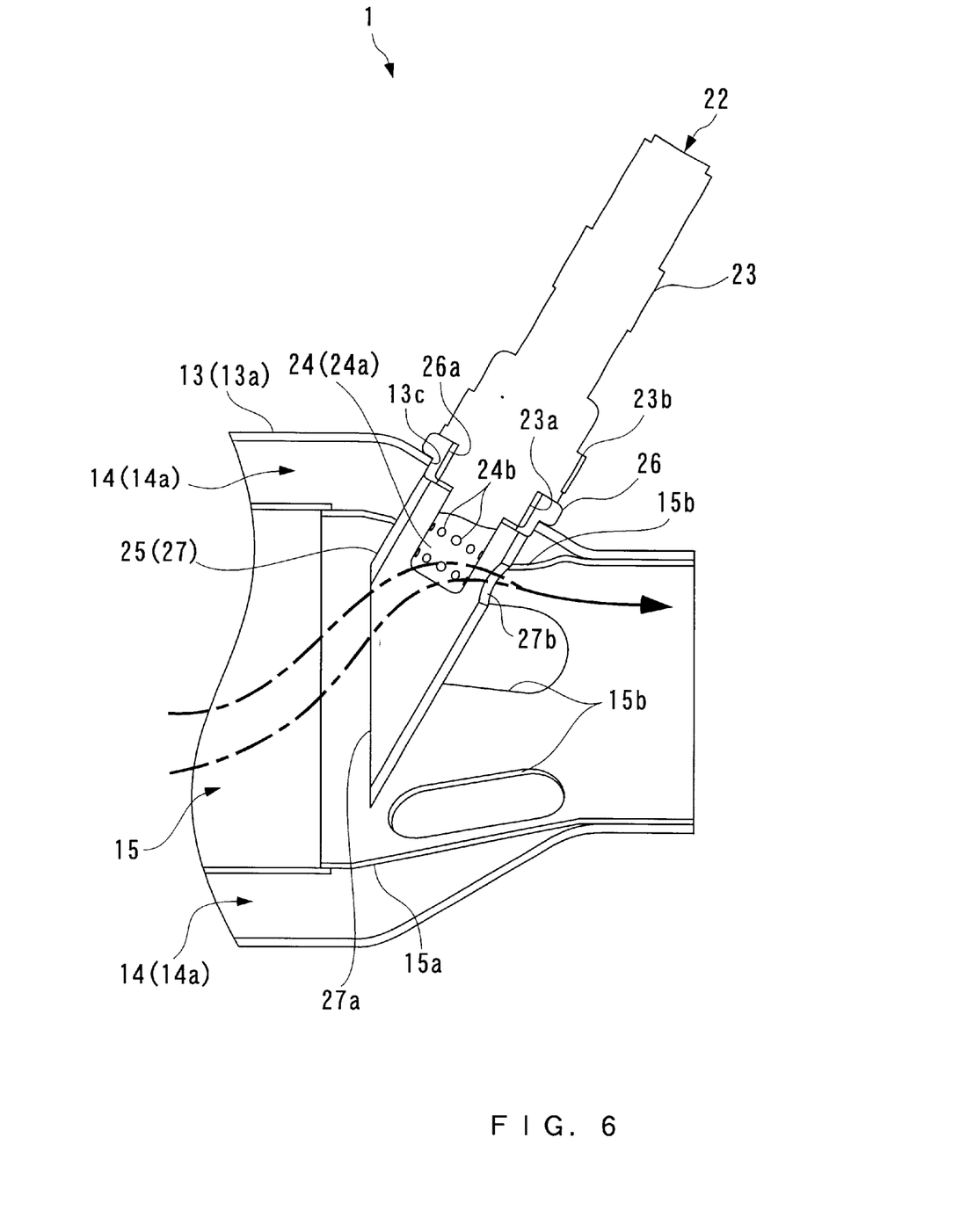
FIG. 6 is a side sectional view generally illustrating the structure of the exhaust gas humidity detecting apparatus.

Further, as illustrated in FIGS. 6 and 7, the exhaust gas humidity detecting apparatus 1 comprises a humidity sensor 22 arranged in a downstream end portion of the junction case 13, and a guide pipe 25 for guiding exhaust gases in the bypass exhaust passage 25 to the humidity sensor 22.

The guide pipe 25 is comprised of a bushing 26 and a circular pipe 27 which are integrated with each other by soldering. These components are both made of a highly thermally conductive metal (for example, stainless steel).

The bushing 26, which is circular in cross-section, is provided for attaching the humidity sensor 22, and is formed with a threaded hole 26a on its inner side. The bushing 26 is fitted into a hole 13c in a downstream end portion of the junction case 13, and is fixed in an air tight state by soldering or the like.

The circular pipe 27 has its upper end fixed to the bushing 26, and passes through one of the five throughholes 15b, extends obliquely toward the upstream direction, and protrudes into the bypass exhaust passage 15. The circular pipe 27 is formed at a leading end thereof with an opening which is oblique with respect to its axial line. This opening serves as an exhaust gas introducing port 27a for introducing exhaust gases into the guide pipe 25. The exhaust gas introducing port 27a substantially occupies a central portion of the cross section of the bypass exhaust passage 15, faces in the upstream direction, and has its opening face positioned orthogonal to the axial line of the bypass exhaust passage 15. Also, the exhaust gas introducing port 27a is positioned upstream of the throughhole 15b.

The circular pipe 27 is further formed at an upper end thereof with an exhaust gas discharging port 27b. This exhaust gas discharging port 27b has a relatively small diameter, and faces to the downstream side of the bypass exhaust passage 15. With the foregoing structure, a portion of exhaust gases flowing into the bypass exhaust passage 15 is guided into the guide pipe 25 through the exhaust gas introducing port 27a, and returned to the bypass exhaust passage 15 through the exhaust gas discharging port 27b.

The humidity sensor 22 detects the humidity of exhaust gases which have passed through the HC adsorbent 16, and sends a detection signal indicative of a detected humidity to the ECU 20. The ECU 20 executes a deterioration determination for the HC adsorbent 16 based on the detection signal from the humidity sensor 22. Although specific details are omitted herein, the deterioration determination may be carried out, for example, by a technique which has been described in Japanese Patent Application No. 2000-66443 by the Applicant.

The humidity sensor 22 is comprised of a rod-shaped main body 23 having a circular cross section, a sensing unit 24 protruding downward from the main body 23, and so on. The main body 23 is formed, in order from the bottom, with a male screw 23a for screw engagement with the threaded hole 26a of the bushing 26, and a hexagonal nut 23b. The humidity sensor 22 is removably attached to the junction case 13 in an air tight state by turning the hexagonal nut 23b with a tool and screwing the mail screw 23a into the threaded hole 26a of the bushing 26.

The sensing unit 24 has a diameter smaller than the inner diameter of the circular pipe 27, faces in the circular pipe 27, and is positioned near the exhaust gas discharging port 27b. The sensing unit 24 comprises a sensing element, not shown, and a closed cylindrical cover 24a for covering the sensing element. The cover 24a is formed with a large number of sensing holes 24b over its entirety. With the foregoing structure, a portion of exhaust gases introduced into the guide pipe 25 is led to the sensing element through the sensing holes 24b of the cover 24a for detecting the humidity of the exhaust gases.

The ECU 20 is based on a microcomputer which comprises an I/O interface, a CPU, a RAM and a ROM. Detection signals from a variety of sensors (not shown) such as the humidity sensor 22 undergo A/D conversion and waveform shaping in the I/O interface before they are inputted to the CPU. The CPU determines an operating state of the engine 2 with reference to the detection signals from the variety of sensors in accordance with a control program or the like stored in the ROM, and controls a switching operation of the flow path switching valve 17 in accordance with the determined operating state in a manner described below.

Specifically, when the temperature of the three-way catalysts 7 is still low immediately after starting the engine 2 so that the three-way catalysts 7 are in an inactivated state, a negative pressure in the intake pipe 9 is supplied to the actuator 18 through the actuator driving electromagnetic valve 21. This causes the actuator 18 to switch the flow path switching valve 17 from the main position to the bypass position to close the main exhaust passage 14 and simultaneously open the bypass exhaust passage 15. As a result, exhaust gases pass through the HC adsorbent 16 and are emitted to the atmosphere (see FIG. 5). In this event, hydrocarbons in the exhaust gases are adsorbed by the HC adsorbent 16.

In addition, since the exhaust gas introducing port 27*a* of the guide pipe 25 substantially occupies a central portion of the bypass exhaust passage 15 and is arranged to face in the upstream direction, exhaust gases which have passed through the HC adsorbent 16 are sufficiently introduced from the exhaust gas introducing port 27*a* into the guide pipe 25, and subsequently returned to the bypass exhaust passage 15 from the exhaust gas discharging port 27*b*. In this event, a portion of the exhaust gases introduced into the guide pipe 25 is lead to the sensing element through the sensing holes 24*b* of the humidity sensor 22, so that the humidity of the exhaust gases is detected by the sensing element.

At the time the predetermined time period t1 has elapsed after the start of the engine 2, the negative pressure supplied to the actuator 18 is stopped, and the flow path switching valve 17 is switched to the main position to close the bypass exhaust passage 15 and simultaneously open the main exhaust passage 14. At this time, since the three-way catalysts 7 have already started activating, the exhaust gases are subsequently purified by the catalyzer 8, and emitted to the atmosphere through the throughholes 15*b* after they have passed through the troidal passage 14*a* (see FIG. 4).

In this event, since the guide pipe 25 extends across the troidal passage 14*a*, the sensing unit 24 of the humidity sensor 22 is protected by the guide pipe 25 and therefore is not exposed to exhaust gases. Also, as mentioned above, since the exhaust gas introducing port 27*a* opens in the upstream direction at a location upstream of the throughholes 15*b*, exhaust gases passing through the throughholes 15*b* hardly flow into the guide pipe 25.

In addition, the heat exchange occurring when the exhaust gases pass through the troidal passage 14*a* causes the temperature of the HC adsorbent 16 to rise to the aforementioned desorption starting temperature or higher, so that hydrocarbons adsorbed on the HC adsorbent 16 start desorption. Further, as the temperature of the HC adsorbent 16 rises to a full desorption temperature or higher, the hydrocarbons are fully desorbed from the HC adsorbent 16. In this event, the EGR operation is not performed until the operating state of the engine 2 is stabilized, so that the EGR pipe 19 is maintained in a closed state. Also, since exhaust gases passing through the troidal passage 14*a* and the throughholes 15*b* have a pressure so high that hydrocarbons desorbed from the HC adsorbent 16 are not emitted to the atmosphere but remains in the bypass exhaust passage 15.

Then, the EGR operation is performed after the operating state of the engine 2 has been stabilized, so that the desorbed hydrocarbons are recirculated to the intake pipe 9 through the EGR pipe 19 together with EGR gases (recirculated exhaust gases), and burnt by the engine 2.

In this event, the EGR gases flow through the bypass exhaust passage 15 from the downstream side to the upstream side, whereas the exhaust gas introducing port 27*a* opens in the upstream direction, and the exhaust gas discharging port 27*b* has a relatively small diameter, thereby substantially preventing the EGR gases from flowing into the guide pipe 25. Also, as mentioned above, since the guide pipe 25 has a high thermal conductivity, the heat of exhaust gases is dissipated from the guide pipe 25 to the junction case 13 during the operation of the engine 2. This can prevent excessive temperature rise of the humidity sensor 22 due to the heat of exhaust gases conducting to the humidity sensor 22 from the guide pipe 25. The heat dissipated by the guide pipe 25 is particularly effective when the engine 1 is operating in a high load condition with high temperature exhaust gases flowing through the main exhaust passage 14.

As describe above, exhaust gases hardly flow into the guide pipe 25 when the flow path switching valve 17 remains at the main position so that the exhaust gases are flowing through the troidal passage 14*a* and the throughholes 15*b* in the downstream direction (including such a situation during an EGR operation as well). On the other hand, exhaust gases are sufficiently introduced into the guide pipe 25 from the exhaust gas introducing port 27*a* only when the flow path switching valve 17 remains at the bypass position so that the exhaust gases are passing through the bypass exhaust passage 15 in the downstream direction. Thus, the sensing unit 24 of the humidity sensor 22 can reliably detect the humidity of exhaust gases which have passed through the HC adsorbent 16. For the same reason, since the sensing unit 24 of the humidity sensor 22 is exposed to exhaust gases for a shorter time than before, the humidity sensor 22 is less susceptible to corrosion and so on, and is additionally prevented from excessive temperature rise due to the heat dissipating effect of the guide pipe 25. This can extend the lifetime of the humidity sensor 22. Also, since the humidity sensor 22 can reliably detect the humidity of exhaust gases which have passed through the HC adsorbent 16, a deterioration determination can be reliably made for the HC adsorbent 16.

Further, since the humidity sensor 22 is attached to the junction case 13 by screwing the mail screw 23*a* into the threaded hole 26*a* of the bushing 26, the humidity sensor 22 alone can be readily removed, thereby facilitating the maintenance.

Figure 8:
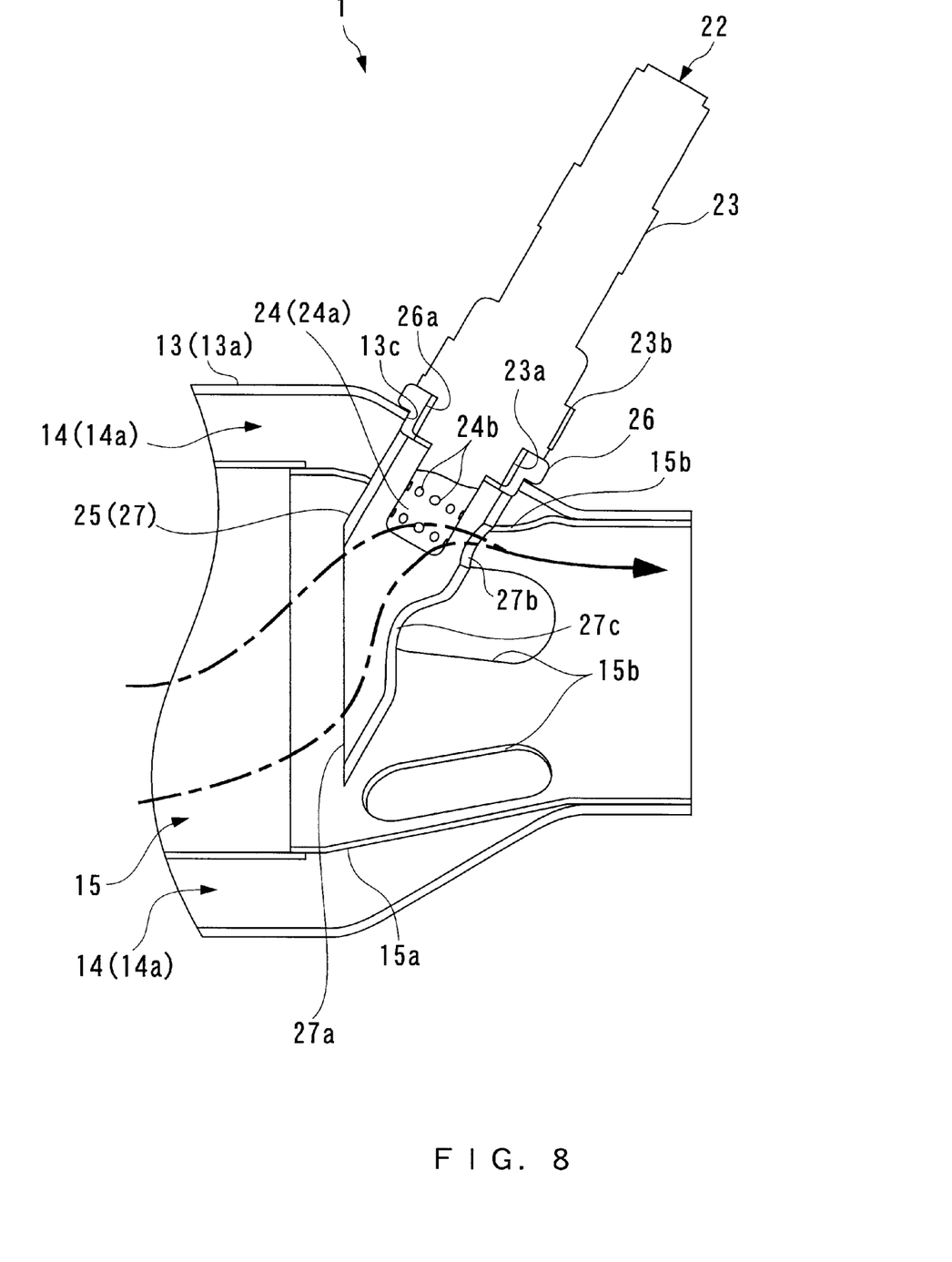
FIG. 8 is a side sectional view generally illustrating the structure of an exemplary modification to the exhaust gas humidity detecting apparatus.

FIG. 8 illustrates an exemplary modification to the guide pipe 25 in the foregoing embodiment. The illustrated guide pipe 25 differs from the embodiment only in that it comprises a flow path adjuster 27*c*. The flow path adjuster 27*c* is formed by depressing a portion of the cylinder 27 below the sensing unit 24 inward. Thus, a portion of exhaust gases introduced into the guide pipe 25 can be directed to the sensing unit 24 by the flow path adjuster 27*c*. This can increase the amount of exhaust gases introduced to the sensing unit 24, and therefore improve the reliability of the detection results provided by the humidity sensor 22.

The characteristic of exhaust gases detected by a sensor is not limited to the humidity in the foregoing embodiment, but may be an oxygen concentration, temperature or the like of the exhaust gases. Also, the bushing 26 of the guide pipe 25 and the thickness of the circular pipe 27 may be increased to provide larger heat masses thereof, thereby further suppressing temperature rise of the humidity sensor 22. This can further extend the lifetime of the humidity sensor 22.

According to the exhaust gas characteristic detecting apparatus for an internal combustion engine of the present invention, it is possible to reliably detect the characteristic of exhaust gases passing through an inner exhaust passage in a double-structure exhaust passage comprised of inner and outer exhaust passages and to extend the lifetime of a sensor.

What is claimed is:

1. In an internal combustion engine having an inner exhaust passage and an outer exhaust passage arranged to surround the outside of said inner exhaust passage such that exhaust gases are discharged through one of said inner and outer exhaust passages, an exhaust gas characteristic detecting apparatus for detecting a characteristic of exhaust gases passing through said inner exhaust passage comprising:

a guide pipe extending through said outer exhaust passage and having an exhaust gas introducing port facing said inner exhaust passage for introducing exhaust gases flowing into said inner exhaust passage into said guide pipe; and a sensor having a sensing unit for detecting the characteristic of exhaust gases and arranged such that said sensing unit is positioned in said guide pipe.

2. An exhaust gas characteristic detecting apparatus for an internal combustion engine according to claim 1, wherein:

said inner exhaust passage includes an adsorbent arranged therein for temporarily adsorbing unburnt components and moisture in exhaust gases flowing into said inner exhaust passage and desorbing the once adsorbed unburnt components and moisture;

said guide pipe is arranged at a location downstream of said adsorbent in said inner exhaust passage; and said sensor includes a humidity sensor for detecting a humidity of exhaust gases which have passed through said adsorbent.

* * * * *